Feb. 18, 1958 — R. S. WILLIS — 2,823,699
VALVED COUPLING EMBODYING FLUID PRESSURE ACTUATED LOCKING MEANS
Filed Nov. 20, 1953
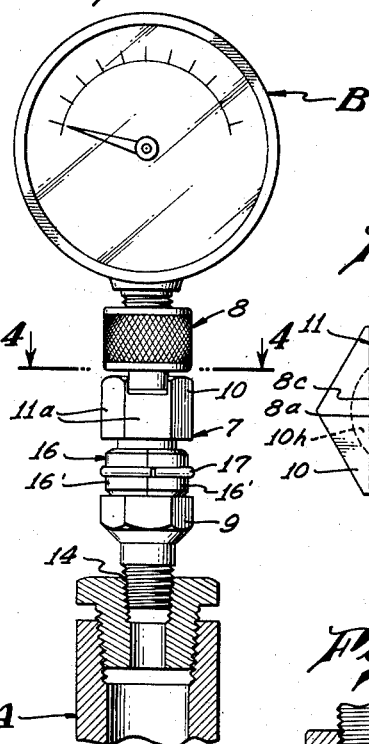
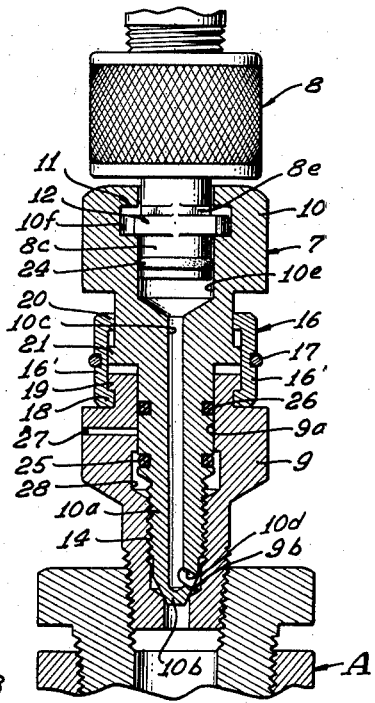
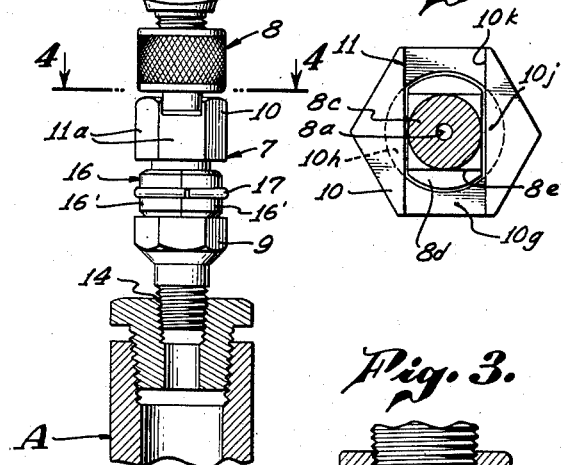
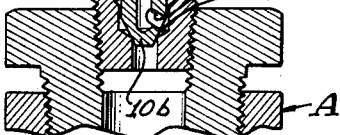
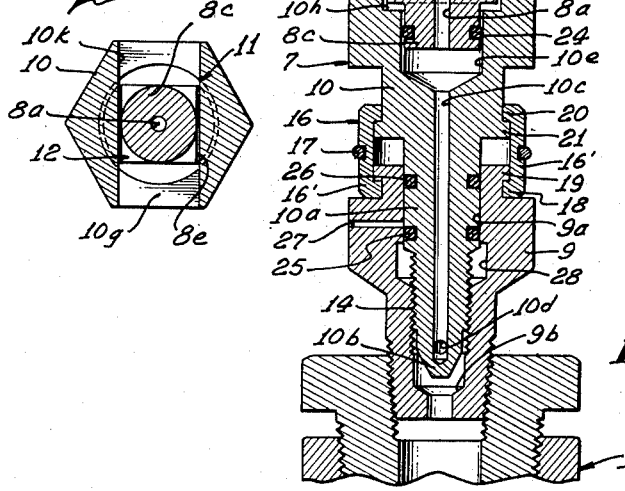
INVENTOR.
ROBERT S. WILLIS,
BY Paul A. Weilein
ATTORNEY.

United States Patent Office 2,823,699
Patented Feb. 18, 1958

2,823,699

VALVED COUPLING EMBODYING FLUID PRESSURE ACTUATED LOCKING MEANS

Robert S. Willis, Long Beach, Calif., assignor, by direct and mesne assignments, of ninety-eight and three-fourths percent to Willis Oil Tool Co., Long Beach, Calif., a corporation of California, and one and one-fourth percent to Elmer L. Decker, Long Beach, Calif.

Application November 20, 1953, Serial No. 393,378

16 Claims. (Cl. 137—625.26)

This invention relates to valved couplings for effecting a detachable connection between conduits or vessel containing fluid under pressure.

One of the objects of this invention is to provide a valved coupling which embodies novel fluid pressure actuated means for releasably locking the conduits or vessels connected thereby against being disconnected while the valve means is unseated.

It is another object of this invention to provide in a coupling such as described, novel means which, responsive to seating of the valve means, will vent to the atmosphere the fluid pressure that has actuated the locking means, thereby releasing the locking means whereby the conduits or vessels joined by the coupling may be disconnected from one another.

In oil fields, oil refineries, and systems for the transmission and storage of fluids under pressure, it is the practice to install numerous pressure gauges at various locations in the lines, conduits and vessels containing the fluid under pressure. At prescribed times it is the custom for an operator or attendant to read these gauges to ascertain the pressures at such various locations.

In consideration of the above noted practice it is an important object of this invention to provide coupling means which makes it possible to employ a single portable gauge for selectively taking readings at various locations in pipe lines, conduits and vessels of systems for the transmission and storage of fluid under pressure.

Accordingly, a coupling embodying the present invention includes a pair of complementary coupling members or fittings having means cooperable to effect a quick-detachable connection thereof. One of these coupling members is provided with manually operable valve means for controlling the flow of fluid through the coupling. In addition, these members cooperably provide in association with the means for detachably connecting them one to the other, a fluid pressure actuated means which locks the members against being disconnected while the valve means is unseated. Also embodied in the coupling is means which, upon seating of the valve means, will vent to the atmosphere the pressure which actuated the locking means, thereby releasing the locking means so that the coupling members may be disconnected from one another.

In the use of coupling means embodying this invention, for temporarily connecting a portable gauge at various points in pipe lines, conduits and vessels such as described, a plurality of the coupling members having the valve means embodied therein are permanently installed at various points in such lines, conduits or vessels where it is desired to take pressure readings. The arrangement for taking these readings is completed by fixing to a suitable portable gauge a companion coupling member embodying means providing for quick-detachable connection thereof with any one of the permanently installed valved coupling members. When such a connection is made, the operator unseats the valve means, thereby actuating the gauge which is locked against removal while the valve means is unseated. Upon seating the valve means, the venting means provided in the coupling, relieves to the atmosphere the pressure trapped in the gauge and coupling member, thereby releasing the pressure actuated locking means whereby the coupling member fixed to the gauge together with the latter may be detached from the valved coupling member.

It will now be apparent that it is an obpect of this invention to provide a novel valved coupling member or fitting which is a complete unit in that it includes a valve operable to control the flow of fluid therethrough also means making it possible to effect a quick-detachable connection thereof with a suitable complementary coupling part of exceptionally simple construction, thereby making the fitting subject to various uses for joining pipes or vessels.

This invention possesses many other advantages and has other objects which may be made more easily apparent from a consideration of one embodiment of the invention. For this purpose there is shown one form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 1 is an elevational view of a valved coupling device embodying the present invention as it would appear when employed to connect a pressure gauge with a conduit or vessel for fluid under pressure;

Fig. 2 is an enlarged vertical sectional view, partly in elevation, of the coupling shown in Fig. 1 as it would appear with the valve seated and the pressure actuated locking means in releasing position;

Fig. 3 is a vertical sectional view of the coupling shown in Fig. 2 as it would appear with the valve unseated and the locking means operative to lock the coupling members against being disconnected;

Fig. 4 is a cross sectional view taken on the line 4—4 of Fig. 1;

Fig. 5 is a cross sectional view taken on the line 5—5 of Fig. 3, and

Fig. 6 is a fragmentary perspective view of a part of one of the coupling members which provides a part of the fluid pressure actuated means for locking the two coupling members together.

With reference to the accompanying drawing, it will be seen that a coupling embodying the present invention comprises a valved coupling member 7 and companion coupling member 8 constructed and arranged for effecting a quick detachable connection between pipes, conduits, or vessels containing fluid under pressure. As here shown, the valved coupling member 7 has a screw threaded connection with a pipe line or vessel, not shown, by means of fittings A, whereas the coupling member 8 is threadedly connected with the pressure gauge B. With this application of the coupling, the gauge B may be quickly and easily connected with and disconnected from the pipe line or vessel.

In systems for storing and conducting fluid under pressure wherein numerous pressure gauges are installed at various locations to provide for pressure readings at such points, an appreciable saving in installation and operation costs may be effected by permanently installing a plurality of the valve coupling members 7 at such locations in place of the gauges and by using a single gauge to which is fitted one of the companion coupling members 8. With this arrangement an operator or attendant may effect a quick detachable connection of the gauge with any one of the valved coupling members 7. When the gauge is connected in this manner, the valved coupling member 7 is operated to open the valve means therein, whereupon the gauge will be operated to indicate the pressure at the location of the member 7.

Responsive to the opening of the valve means, a fluid pressure operated locking means embodied in the coupling members 7 and 8, as will be hereinafter described, will operate to prevent disconnection of the coupling members while the valve is unseated. When the valve means is seated, pressure-relieving means in the member 7 operates to vent to the atmosphere the pressure which actuated the locking means, thereby releasing the locking means for quickly and easily detaching the coupling member 8 and gauge from the coupling member 7.

The coupling member 7 is formed of two relatively movable parts which comprise a body 9 and what may be termed a valve member 10, which latter, however, at its outer end, is provided with a female coupling element 11 for reception of a male coupling element 12 on the companion coupling member 8.

The body 9 has a through bore 9a in which is disposed for axial movement, a reduced portion 10a of the valve member 10. The reduced portion 10a has a screw threaded connection at 14 with the member 9 whereby upon rotative movement of the valve member 10 a conical valve element 10b on the lower end of the reduced portion 10a may be moved into and out of seated engagement with an annular valve seat 9b in the bore 9a.

The valve member 10 also has a through bore 10c leading from a port 10d axially spaced from the valve element 10b, to a counterbore 10e forming a part of the coupling element 11. When the valve element 10b is seated, the flow of fluid through the body 9 and valve member 10 is shut off. When the valve element is unseated, the port 10d and the bore 10c in the member 10 are open to flow of fluid from the fittings A into the counterbore 10e. When the coupling member 8 is coupled to the coupling member 7 and the valve means in the latter is unseated, the fluid will flow from the counterbore 10e through passage 8a in member 8 into the gauge B, thereby actuating the gauge. At this time the locking means which will be hereinafter described, is actuated by the fluid pressure to lock the coupling members 7 and 8 against being disconnected.

The two relatively movable parts of the coupling member 7, namely the body 9 and the valve member 10, are maintained in assembled relation by means of a split band 16 which embraces the members 9 and 10 and is formed of two semi-circular sections 16' held together by a snap ring 17. Complementary flanges 18 on the sections 16' of the band 16 overlap a flange 19 on the outer end of the body 9, while similar flanges 20 on the sections 16' overlie a flange 21 on valve member 10, thereby holding the members 9 and 10 subject to limited relative axial movement. The flanges 18 and 20 are axially spaced to permit of sufficient axial movement of the valve member 10 to seat and unseat the valve element 10b. This arrangement is such that when the valve member 10 is rotated and thereby moved axially to fully unseat the valve element 10b as shown in Fig. 3, the flange 21 will abut the flanges 20 on the band, thereby limiting such movement of the valve member.

The outer end of the valve member 10 is provided with angularly related faces 11a for engagement with a wrench or suitable tool for turning the valve member 10 to seat and unseat the valve element 10b.

The female coupling element 11 embodies the counter bore 10e, another counterbore 10f and a groove 10g extending transversely of the outer end of the member 10. These counterbores and the groove form an outwardly facing annular shoulder 10h and a pair of inwardly facing outer shoulders 10j axially spaced from the shoulder 10h on opposite sides of the groove 10g.

The male coupling element 12 on the coupling member 8 includes a coaxial reduced extension 8c of the member 8 which is adapted to be positioned in the female coupling element 11 and turned about its axis to dispose a pair of laterally extending flanges 8d thereof between the annular shoulder 10h and the two shoulders 10j, as shown in Figs. 3, 4 and 5. When thus positioned, the coupling members 7 and 8 are restrained against such relative axial movement as will separate them, but are permitted limited relative axial movement and are subject to rotative movement until locked. In placing the extension 8c in the female coupling element 11, the flanges 8d are aligned with the groove 10g, whereby the extensions may be moved freely into the female element to dispose the flanges 8d upon the annular shoulder 10h inwardly of the opposed shoulders 10j in a position such that a short turning movement of the member 8 about its axis will bring the flanges between said shoulders.

Locking means is provided to prevent the coupling member 8 from being turned about its axis and thereby moving the flanges 8d from between the shoulders 10h and 10j into position such that the coupling members may be uncoupled while the valve element 10b is unseated. This locking means operates responsive to pressure of the fluid in the coupling incident to unseating of the valve element 10b, and includes a pair of locking shoulders 8e formed on the sides of the extension 8c on which the flanges 8d are provided. These locking shoulders 8e are adapted to engage the axially extending opposed walls 10k formed by the groove 10g and when so engaged will restrain the valve member 10 from being turned about its axis.

The locking engagement of the shoulders 8e with the walls 10k will take place when the valve element 10b is unseated and the fluid pressure against the extension 8c causes the latter to move axially outward into the position shown in Fig. 3. The axial spacing of the outer shoulders 10j from the annular inner shoulder 10h permits of the axial movement of the extension 8c into and out of the aforesaid locking position. A packing ring 24 is carried by the extension 8c so as to engage the wall of the counterbore 10e, whereby the extension will act as a piston responsive to fluid pressure, this ring also preventing leakage of fluid between the extension 8c and the wall of the counterbore 10e.

A pair of axially spaced packing rings 25 and 26 are carried by the reduced portion 10a of the valve member 10 so as to engage the wall of the bore 9a to prevent leakage between this reduced portion and the wall of the bore 9a when the valve is unseated.

To provide for relieving to the atmosphere the fluid pressure which is trapped in the coupling when the valve element 10b is seated, a bleed port 27 is formed in the body 9 so that the inner end thereof opens into the bore 9a between the packing rings 25 and 26 while the outer end opens to the atmosphere. However, the packing rings 25 and 26 are located so that when the valve element 10b is seated, the packing ring 25 will be disposed in an enlargemnet 28 of the bore 9a and thereby become ineffective as a seal while the packing ring 26 is spaced outwardly from the port 27 and forms the desired seal. Thus, the fluid pressure trapped in the coupling when the valve element 10b is seated, will escape through the port 10d, into the bore 9a above the valve seat 9b, thence between the screw threads 14 into the enlargement 28 and pass between the body 9 and the reduced portion 10a to the atmosphere through the bleed port 27. When this pressure is relieved, the reduced extension 8c will either gravitate or may be manually moved inwardly to move the locking shoulders 8e from locking engagement with the walls 10k, whereby the member 8 may be turned about its axis to move the flanges 8d out of locked engagement with the shoulder 10j so that the member 8 and gauge thereon may be removed from the coupling member 7.

It will now be apparent that the present invention provides a novel and highly efficient self-locking coupling adapted for a safe and advantageous use for effecting a quick detachable connection between various conduits and vessels containing fluid under high pressures. Accordingly, it is to be understood that the coupling may be put to many uses other than here shown and described and wherein it is desired that the coupling members will be automatically locked against uncoupling by fluid pressure responsive means when valve means therein is manually unseated, and wherein it is desired that the flow of fluid into the coupling must be positively shut off and the trapped fluid therein relieved to the atmosphere before the coupling members may be uncoupled.

I claim:

1. A valved coupling including: a pair of coupling members having fluid passages; means for detachably connecting said coupling members, with said passages registering to form a flow channel through said coupling; valve means in said channel for communicating said channel with a source of fluid under pressure; means for opening and closing said valve means; and elements on said coupling members engageable with one another for locking said coupling members against disconnection responsive to fluid pressure in said channel upon opening said valve means; said locking elements being disengageable upon reduction of said fluid pressure in said channel.

2. A valved coupling including: a pair of coupling members having fluid passages; means on said members cooperable for detachably connecting said members, with said passages registering to form a flow channel through said coupling; valve means in one of said members for communicating said channel with a source of fluid under pressure; means operable exteriorly of said members for opening and closing said valve means; locking elements on said coupling members cooperable responsive to fluid pressure in said channel for locking said members against disconection when said valve means is opened; and means operable responsive to closing of said valve means for relieving to the atmosphere the fluid pressure in said channel between said valve means and said locking elements to release said locking elements.

3. A valved coupling including: a pair of coupling members having fluid passages; means carried by said members cooperable for detachably connecting them one to the other with said passages registering to form a flow channel through the members; valve means in one of said members operable for opening and closing said channel; means operable on said one member for opening and closing said valve means; locking means on said coupling members; the other of said coupling members being movable responsive to fluid pressure in said channel to engage the locking element thereon with the locking element on said one coupling member for locking said coupling members against detachment one from the other while said valve means is open; and means for relieving the fluid pressure in said channel between said one coupling member and said valve means upon the closing of said valve means.

4. A valved coupling including: a pair of coupling members having fluid passages; means carried by said members cooperable for detachably connecting them one to the other for limited relative axial movement with said passages registering to form a flow channel therethrough; valve means in said channel operable for opening and closing said channel; means for opening and closing said valve means; one of said coupling members being axially movable responsive to fluid pressure in said channel; means in said channel axially spaced from said valve means, operable responsive to axial movement of said one coupling member for locking said members against detachment from one another while said valve means is open; and means operable responsive to the closing of said valve means for venting fluid pressure from said channel between said valve means and said locking means to release said locking means.

5. A valved coupling including: a pair of coupling members; one of said coupling members having a body formed with a through bore and a valve seat in said bore; a valve member rotatably and axially movably mounted in said bore; a valve element on said valve member; means on said body and said valve member cooperable for moving said valve member axially to seat and unseat said valve element responsive to rotation of said valve member; said valve member having a passage which opens at one end into said bore at a point axially spaced from said valve element; the other of said coupling members having a portion adapted to be mounted in said passage; means on said portion and said valve member cooperable upon rotation of said portion to a predetermined position for holding said portion and said valve member in coupled relation subject to limited relative axial movement; said other coupling member having a passage therethrough adapted to register with the passage in said valve member; said portion moving axially responsive to fluid pressure upon unseating said valve element; and means on said portion and said valve member cooperable to lock said portion from being rotated out of said predetermined position responsive to said axial movement of said portion.

6. A valved coupling including: a pair of coupling members; one of said coupling members having a body formed with a through bore and a valve seat in said bore; a valve member rotatably and axially movably mounted in said bore; a valve element on said valve member; means on said body and said valve member cooperable for moving said valve member axially to seat and unseat said valve element responsive to rotation of said valve member; said valve member having a passage which opens at one end into said bore at a point axially spaced from said valve element; the other of said coupling members having a portion constructed and arranged to be positioned in said passage for limited axial movement therein responsive to fluid pressure thereagainst upon unseating said valve element; means on said portion and said valve member cooperable upon rotation of said portion to a predetermined position for holding said portion and said valve member coupled, with said portion subject to said limited axial movement; said other coupling member having a passage therethrough adapted to register with the passage in said valve member; means on said portion and said valve member cooperable to lock said portion against rotation from said predetermined position responsive to said axial movement of said portion; and means operable upon the seating of said valve element to vent to the atmosphere the fluid pressure between said seat and said axially movable portion.

7. A valved coupling including: a pair of coupling members; one of said coupling members having a body formed with a through bore and a valve seat in said bore; a valve member rotatably and axially movably mounted in said bore; a valve element on said valve member; means on said body and said valve member cooperable for moving said valve member axially to seat and unseat said valve element responsive to rotation of said valve member; said valve member having a passage which opens at one end into said bore at a point axially spaced from said valve element; the other of said coupling members having a portion constructed and arranged to be positioned in said passage for axial movement therein responsive to fluid pressure thereagaainst upon unseating said valve element; said other coupling member having a passage therethrough adapted to register with the passage in said valve member; locking elements on said portion and said valve member interengageable upon rotation of said portion to a predetermined position to hold said portion and said valve member coupled while said portion is subject to said axial movement; and means responsive to said fluid pressure effected axial movement of said portion while said valve element is unseated to lock said portion against rotation from said predetermined position.

8. A valved coupling including: a pair of coupling members; one of said coupling members having a body formed with a through bore and a valve seat in said bore; a valve member rotatably and axially movably mounted in said bore; a valve element on said valve member; means on said body and said valve member cooperable for moving said valve member axially to seat and unseat said valve element responsive to rotation of said valve member; said valve member having a passage which opens at one end into said bore at a point axially spaced from said valve element; the other of said coupling members having a portion constructed and arranged to be positioned in said passage for axial movement therein responsive to fluid pressure thereagainst upon unseating said valve element; said other coupling member having a passage therethrough adapted to register with the passage in said valve member; elements on said portion and said valve member interengageable upon movement of said portion into a predetermined position to hold said portion against being uncoupled from said valve member while permitting limited axial movement of said portion; means responsive to said fluid pressure effected axial movement of said portion while said valve element is unseated to lock said portion against movement out of said predetermined position; and means operable upon the seating of said valve element to vent to the atmosphere the fluid pressure between said seat and said portion whereby said portion may be moved out of said predetermined position.

9. A valved coupling including: a pair of coupling members; one of said coupling members having a body formed with a through bore and a valve seat in said bore; a valve member rotatably and axially movably mounted in said bore; a valve element on one end of said valve member; said valve member and said body being connected by screw threads whereby the valve element may be seated and unseated upon relative rotation between said body and said valve member; said valve member having a through passage which opens at one end into said bore at a point axially spaced from said valve element; axially spaced sealing rings on said valve member for sealing against the wall of said bore; said body having a bleed port which opens into said bore between said rings; said bore being enlarged between said seat and said port; one of said rings being disposed in said enlargement of said bore so as to be ineffective as a seal when said valve element is seated whereby fluid pressure trapped in the coupling will vent through said port; said valve member having a female coupling element on the other end thereof; the other of said coupling members having a male coupling element adapted to be mounted in said female coupling element for rotation and axial movement therein; coupling portions on said coupling elements movable into and out of a predetermined position to hold said coupling elements in coupled relation responsive to relative rotation between said coupling elements; said male coupling element being constructed and arranged to be moved axially outwardly from said female element responsive to fluid pressure when said valve element is unseated; and means operable responsive to said axial movement of said male coupling element for locking said coupling portions against being rotated from said predetermined position.

10. A valved coupling including: a pair of coupling members; one of said coupling members having a body formed with a through bore and a valve seat in said bore; a valve member rotatably and axially movably mounted in said bore; a valve element on one end of said valve member; said valve member and said body being connected by screw threads whereby the valve element may be seated and unseated upon relative rotation between said body and said valve member; said valve member having a through passage which opens at one end into said bore at a point axially spaced from said valve element; axially spaced sealing rings on valve members for sealing against the wall of said bore; said body having a bleed port which opens into said bore between said rings; said bore being enlarged between said seat and said port; one of said rings being disposed in said enlargement of said bore and ineffective as a seal when said valve element is seated whereby fluid pressure trapped in the coupling will vent through said port; said valve member having a female coupling element on the other end thereof; the other of said coupling members having a male coupling element adapted to be mounted in said female coupling element for rotative and axial movement therein; means on said coupling elements operable to hold said coupling elements in coupled relation upon movement of said male element into a predetermined position; said coupling elements being constructed and arranged whereby said male element will move axially in said female element responsive to fluid pressure when said valve element is unseated; and means on said coupling elements cooperable responsive to said axial movement of said male element to lock said male element against movement out of said predetermined position.

11. A valved coupling member including: a body having a through bore adapted for connection with a conduit or vessel for fluid under pressure; an elongated valve member rotatable and axially movable in said bore; said body having a valve seat in said bore; a valve element on said valve member engageable with said seat; said valve member having a through passage; one end of said passage being open to said bore at a point spaced axially from said valve element so as to be closed to flow of fluid in one direction when said valve element is seated and open to such flow when said valve element is unseated; means on said body and said valve member cooperable to move said valve member axially for seating and unseating said valve element responsive to rotative movement of said valve member; a ring surrounding said valve member and said body; axially spaced stop members on said body, ring and valve members respectively, cooperable to limit axial movement of said valve member; the other end of said passage being enlarged; and means within said enlarged end of said passage providing for connection thereof with a companion coupling member.

12. A valved coupling including: a pair of coupling members; one of said coupling members having a body formed with a through bore; a member mounted in said bore; means surrounding said body and member for holding said member on said body; said member having a passage which opens at one end into said bore; the other of said coupling members having a portion constructed and arranged to be positioned in said passage for rotative movement as well as for axial movement therein responsive to fluid pressure in said passage; said other coupling member having a passage therethrough adapted to register with the passage in said member; elements on said portion and said member cooperable upon rotation of said portion into a predetermined position relative to said member to hold said coupling members in coupled relation with said other coupling member subject to said axial and rotative movement; and other elements on said portion and said member axially spaced from said first named elements and cooperable responsive to said axial movement, to hold said portion of said other coupling member against rotation out of said predetermined position.

13. A valved coupling including: a pair of coupling members; one of said coupling members having a body formed with a through bore; a split ring surrounding said body and said member; means releasably holding said ring assembled; shoulders on said ring, body and member engageable to limit movement between said body and said member; said member having a passage which opens at one end into said bore; the other of said coupling members having a portion constructed and arranged to be positioned in said passage for rotative movement as well as for axial movement therein responsive to fluid pressure in said passage; said other coupling member having a passage therethrough adapted to register with the passage in said member; elements on said portion and said member cooperable upon rotation of said portion into a predetermined position relative to said member for locking said coupling members in coupled relation with said portion subject to said axial and rotative movement; and means on said portion and said member cooperable to lock said portion against being rotated out of said predetermined position responsive to said axial movement of said portion; reduction of fluid pressure in said passage in said member permitting rotation of said portion out of said predetermined position.

14. A valved coupling of the class described, comprising in combination: a male joint part having a flow passage therethrough; a cooperative female joint part having a flow passage therethrough; means for locking said joint parts together responsive to relative rotation of the parts; cooperative stop means on said joint parts for preventing relative rotation of said parts upon slight relative axial movement of said parts in one direction; and valve means in one of said joint parts for selectively permitting and preventing the flow of fluid through said passages; the other joint part having means for effecting relative axial movement of said parts to a relative non-rotating position; said valve-containing part having means for venting said coupling upon operation of said valve means to preclude the flow of fluid through said passages.

15. In a valved fluid coupling having cooperative separable joint parts interlockingly engageable with one another upon relative movement thereof in one direction and disengageable from one another upon relative movement in the other direction, and including means responsive to fluid pressure in the coupling for retaining said joint parts in interlocked engagement; that improvement wherein one of said joint parts is provided with means for venting the coupling to the atmosphere to release said retaining means, the other joint part being provided with means for blocking off the venting means when the coupling is subjected to fluid pressure.

16. In a valved fluid coupling having cooperative separable joint parts interlockingly engageable with one another upon relative movement thereof in one direction and disengageable from one another upon relative movement in the other direction, and including means responsive to fluid pressure in the coupling for retaining said joint parts in interlocked engagement; that improvement wherein the valve comprises a stem axially movable in one of said joint parts, said latter joint part having a vent passage, said stem also having a vent passage, and said stem and said latter joint part having means for interrupting communication of said vent passages when the valve is open and for allowing communication of said vent passages when the valve is closed to vent the coupling to the atmosphere.

References Cited in the file of this patent

UNITED STATES PATENTS

| | | |
|---|---|---|
| 58,179 | Savill | Sept. 18, 1866 |
| 238,437 | Reynolds | Mar. 1, 1881 |
| 538,554 | Siebert | Apr. 30, 1895 |
| 1,054,842 | Heimerman | Mar. 4, 1913 |
| 1,490,227 | Osborn | Apr. 15, 1924 |
| 1,569,178 | Foster | Jan. 12, 1926 |
| 1,600,481 | Nadig | Sept. 21, 1926 |
| 1,846,568 | Nell | Feb. 23, 1932 |
| 1,851,342 | Bacher | Mar. 29, 1932 |
| 1,925,958 | Giles | Sept. 5, 1933 |
| 1,945,760 | Strouf | Feb. 6, 1934 |
| 2,125,554 | Franck | Aug. 2, 1938 |
| 2,245,847 | Bagby | June 17, 1941 |
| 2,638,915 | Mitchell | May 19, 1953 |
| 2,692,609 | Carter | Oct. 26, 1954 |

FOREIGN PATENTS

| | | |
|---|---|---|
| 561,011 | France | July 25, 1923 |